Patented Feb. 20, 1940

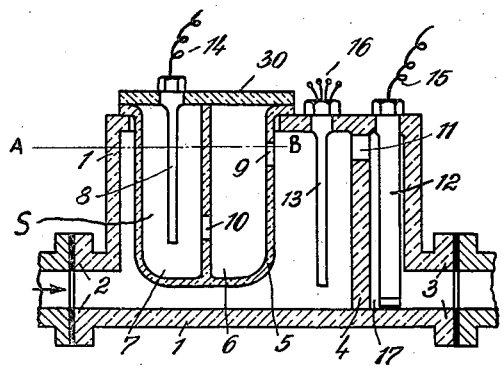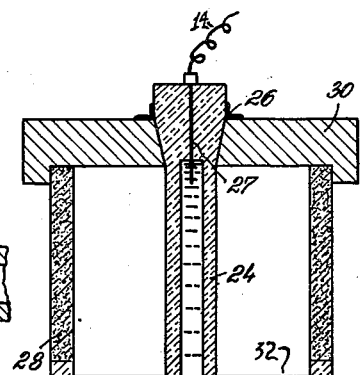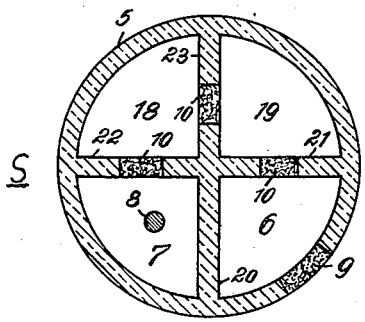

2,190,835

UNITED STATES PATENT OFFICE 2,190,835

ARRANGEMENT FOR CARRYING OUT ELECTROMETRICAL MEASUREMENTS

Heinz Grüss, Paul Kähle, and Fritz Lieneweg, Berlin-Siemensstadt, Germany, assignors to Siemens & Halske, Aktiengesellschaft, Siemensstadt, near Berlin, Germany, a corporation of Germany Application November 30, 1936, Serial No. 113,476
In Germany November 1, 1935

6 Claims. (Cl. 204—5)

Our invention relates to an arrangement for carrying out electrometrical measurements, and consists in a measuring device which is designed as a self-containing unit and can conveniently be inserted into conduit lines and be used for liquids of largely different pressure. According to the invention, more particularly, both a measuring electrode and a standard electrode are arranged in a pressure-tight vessel, preferably of ceramic material, which has flanges or screw threads allowing the vessel to be inserted between conduits so as to form a part of the conduit line.

Further details of our invention will be apparent from the following description taken in connection with the accompanying drawing in which:

Fig. 1 shows a vertical sectional view of a device according to the invention,

Fig. 2 shows a cross section through the standard half cell employed in the device of Fig. 1, the section being taken in the plane indicated in Fig. 1 by dot and dash line A—B, and Fig. 3 is a sectional view of another standard half cell which has proved particularly advantageous.

Referring to Fig. 1, 1 denotes a vessel of ceramic material in which is located a partition 4. The vessel is inserted in a liquid conduit with the aid of flanges 2 and 3 or threaded portions cooperating with cap screws. The vessel is manufactured in such a manner as to be pressure-tight. It is shaped in such a way that its inlet and outlet openings adjoin its bottom, and the portion of the vessel which contains the electrodes forms an extension which protrudes radially from the conduit line. The partition 4 divides this extension into two sections, one of which is much wider than the other. A standard half cell S is arranged in the wider section in a pressure-tight manner, as hereinafter described in connection with Fig. 2. The measuring liquid which flows through the arrangement in the direction of the arrow passes through an aperture 11 arranged in the upper end of the partition 4 into the narrower section containing the measuring electrode 12. This measuring electrode is selected according to the measuring conditions to be complied with, and consists of any suitable material, for instance a solid metal body or a composed glass electrode.

The standard half cell S consists of a vessel 5 in which as will be seen from Fig. 2 a plurality of, for instance four, partitions 20—23 are arranged which extend radially and are perpendicular to each other. By means of these partitions a corresponding number of chambers in the present case the four chambers 6, 19, 18 and 7, are formed. The vessel may be closed in a pressure-tight manner by a cover 30. In the partitions 21, 22, 23 are arranged bodies consisting of material permeable to water (filters 10). Also in the portion of vessel 5 which forms the outer wall of the chamber 6 is provided a filter. The filters may either extend over the entire height of the chambers or they may be preferably displaced with respect to one another. The chamber 7 contains the standard electrode 8 which extends through the cover in a pressure-tight manner and to which is connected a lead 14. The chambers 6, 19 and 18 which form the so-called liquid bridges contain saturated salt solutions.

If desired, the arrangement may be also carried out in such a manner that the individual bridge parts and also the standard semi-element may be separately removed from the apparatus in order to fill up the individual chambers with fresh liquid.

Saturated potassium chloride solution is, as a rule, employed as a liquid for the liquid bridges. It is, however, also possible to represent the individual bridges by different, preferably selected liquids. Thus, for instance, two chambers of the apparatus (6, 19) may be filled up with a saturated potassium-nitrate solution and the other two chambers (18, 7) with a saturated potassium-chloride solution when determining chlorine ion concentrations with a silver-silver chloride electrode. In this case the chamber 7 contains as a standard electrode a silver rod immersed in a silver-chloride solution.

In this manner it is possible to maintain the chlorine ion concentration on the metallic rod practically constant, since only potassium chloride solution which takes up with time only a slight amount of potassium nitrate may pass into the chamber 7 from the adjacent bridge 18. Furthermore, since potassium chloride is present in a saturated form the chlorine ion concentration does not vary on the silver-silver chloride electrode. This electrode will, therefore have a very long life. In the other direction only potassium nitrate solution coming from the apparatus may be taken up by the liquid to be measured, which potassium nitrate does not affect the chloride ion concentration on the measuring electrode.

Instead of a metal rod such as the above-described silver rod any other known type of electrode, for instance, a half cell having a calomel electrode may be employed.

A calomel half cell which has proved particularly advantageous is illustrated in Fig. 3. The half cell S' shown in this figure is to be used instead of the half cell S in an arrangement which otherwise is identical with that of Fig. 1. The half cell S' has an envelope of ceramic material whose lower portion 29 is made of a non-porous substance, whereas the upper portion 28 is made of porous material. To this end, the lower portion is preferably coated with a glaze. The envelope is provided with a pressure-tight cover 30. A rod of ceramic material or glass provided with a lead 14 extends through a hole arranged in the cover into the envelope. The passage of the rod through the cover is also rendered pressure-tight by giving the upper part of the rod a conical form and by soldering or cementing the two annular surfaces 26. Both surfaces, when soldering are premetallized. In this manner a pressure-tight and permanent seal is obtained.

The terminal may, for instance, be designed in the form of a hollow rod whose upper portion 24 is impermeable and whose lower portion 25 is porous. When using a ceramic substance for the hollow rod, the upper portion thereof may be glazed, whereas, when employing glass, the porous portion of the tube is made of a permeable special glass. The hollow rod extending into the envelope is closed at both ends and before being placed therein it is evacuated through its porous portion 25 and mercury is allowed to permeate the porous portion so as to completely fill up the inner space of the tube. The current is supplied to the mercury by a lead 14 and a platinum wire 27 arranged in the upper end of the hollow rod. The porous portion 25 of the hollow rod has such a length that it immerses completely in a mercury-mercury-chloride paste 31, the level 32 of which in the envelope lies somewhat below the porous portion 28 of the envelope.

The remaining space above the calomel paste 31 is filled up with a suitable electrolyte such as a saturated solution of potassium chloride.

In the embodiment shown in Fig. 1, the measuring electrode 12 consists of a metal rod, for instance of antimony, and is arranged in the cylindrical narrow section of the vessel 1 in such a manner that the rod is perfectly sealed off from the outside atmosphere. The rod has a longitudinal recess for the passage of a measuring liquid. This recess may be so formed according to Fig. 1 that the metal as indicated at 17 is ground on one side over its entire length, the ground surface facing the liquid inlet opening 11. According to another embodiment the metal rod is provided with a longitudinal bore, the measuring liquid entering from above, flowing through the bore within the metal rod and flowing off at the bottom. In both arrangements it is at all events preferable to design the sectional area of flow of the electrode so small that with a delivery of at most 500 cm.³/min. a speed of flow of the measuring liquid of at least 4 cm./sec. is attained in the electrode.

The electrodes are preferably inserted in the arrangement in the manner that the liquid surrounds both electrodes in such a manner as to maintain the electrodes at the same temperature.

In order to be independent of fluctuating outside temperatures, at least one resistance thermometer 13 is arranged in a pressure-tight manner in the apparatus. 14, 15 and 16 denote conductors connected to the electrodes and to the thermometer. These conductors serve to insert the apparatus into a conventional measuring and temperature-compensating circuit.

Furthermore, it is advantageous to design the apparatus in such a manner that when emptying the latter no liquid remains therein in which impurities or the like could possibly deposit. In the apparatus shown in Fig. 1, this advantage is obtained by the fact that the inlet and outlet openings are in alignment with the bottom of the vessel 1.

We claim as our invention:

1. A device for electrometrical measurements on flowing electrolytic liquids, comprising a pressure-tight vessel of insulating material designed to be inserted into a line of conduits, said vessel having an inlet and an outlet located on opposite sides so as to have a common geometrical axis coinciding with that of said conduit line, means at said inlet and said outlet for pressure-tightly connecting said vessel with said conduits, an extension forming part of said vessel and protruding radially with respect to said axis, said extension having an opening in its radially protruding end face, an insulating porous container containing a standard electrode and at least one intermediate solution, said container being inserted in said opening so as to be immersed in the liquid flowing through said vessel and to tightly close said opening, a measuring electrode disposed in said extension, and a wall arranged in said vessel transverse to said axis and designed to bend the course of said flowing liquid so as to pass through said extension.

2. A device for electrometrical measurements on flowing electrolytic liquids, comprising a pressure-tight vessel of ceramic material designed to be inserted into a line of conduits, said vessel having an inlet and an outlet located on opposite sides so as to have a common geometrical axis coinciding with that of said conduit line, means at said inlet and said outlet for pressure-tightly connecting said vessel with said conduits, an extension forming part of said vessel and protruding radially with respect to said axis, said extension having an opening in its radially protruding end face, a ceramic substantially cylindrical container inserted into said opening and designed to tightly close said opening, said container being closed at its inner end and having longitudinal partitions radially dividing said cylindrical container into a plurality of chambers for intermediate electrolytic solutions, said partitions and said container having porous sections in order to provide an electric series connection between said liquid and said intermediate solutions, a removable cover disposed to pressure-tightly close said container, a standard electrode mounted to said cover so as to be immersed in the solution of that of said chambers which in said series connection lies at the opposite end with respect to said liquid, a measuring electrode disposed in said extension, and a wall arranged in said vessel transverse to said axis and designed to bend the course of said flowing liquid so as to pass through said extension.

3. A device for electrometrical measurements on flowing electrolytic liquids, comprising a pressure-tight enclosed vessel of insulating material forming a conduit for the liquid to be tested and having an inlet and an outlet opening for said liquid and means for pressure-tightly connecting said openings with that of other conduits, an insulating pot-like container inserted into said vessel so as to have its bottom portion immersed in said liquid, said container having partitions subdividing said container into a plurality of chambers for intermediate electrolytic solutions so as to provide an electric series connection between said liquid and said solutions, a removable cover for pressure-tightly closing said container, a standard electrode mounted on said cover so as to be situated in that of said chambers which in said series connection lies opposite to said liquid, a terminal on said cover and connected with said standard electrode, a measuring electrode arranged in said vessel, and a second terminal connected with said measuring electrode.

4. A device for electrometrical measurements on flowing electrolytic liquids, comprising a pressure-tight vessel having an inlet and an outlet opening for the liquid to be tested, said vessel having a narrow cylindrical and a wide second section series arranged between said two openings, a half cell containing a standard electrode and being arranged in said wide section, a rod-like measuring electrode disposed in said narrow cylindrical section and having substantially the same diameter as said cylindrical section, said rod-like electrode being cut off longitudinally so as to form between its cut-off surface and the wall of said cylindrical section a channel for the passage of said liquid, said two electrodes being pressure-tightly enclosed by said vessel and designed to be connected with a measuring circuit, and means on said vessel for pressure-tightly connecting said inlet and said outlet opening into a line of conduits.

5. A device for electrometrical measurements on flowing electrolytic liquids, comprising an insulating pressure-tightly enclosed vessel having an inlet and an outlet opening arranged at opposite end faces so as to adjoin the bottom of said vessel, means formed by said vessel and surrounding said openings for pressure-tightly connecting said vessel in a line of conduits, said vessel having an extension disposed between said inlet and outlet openings so as to protrude radially with respect to said openings, said extension having bores at its top face, a standard half cell and a measuring electrode pressure-tightly inserted in said bores of said extension, and a partition disposed in said vessel between said half cell and said electrode so as to force the liquid to be tested to flow on a bent course through said extension along said electrode and said half cell.

6. A device for electrometrical measurements on flowing electrolytic liquids under pressure, comprising a pressure-tight vessel having an inlet and an outlet at opposite end faces and means at said inlet and outlet for pressure-tightly inserting said vessel in a line of conduits, an insulating pot-like container provided with a calomel paste and a solution containing chlorine ions, said container being inserted into said vessel so as to be immersed at least with its bottom portion in the liquid flowing through said vessel, said container having a porous section in order to provide an electric connection between said solution and said liquid, a cover pressure-tightly closing said container, said cover having a bore and a metal plated surface around said bore, a ceramic pipe closed at both ends and containing mercury arranged in said container and mounted in said bore of said cover, the surface of said pipe adjacent to said metal plated surface of said cover being metal plated and soldered to said cover surface, said ceramic pipe being closed on its inner end and having a porous section permeable to water, a terminal arranged on the outer surface of said cover and connected with said mercury, and a measuring electrode arranged in said vessel in the path of said flowing liquid and having also an outside terminal.

HEINZ GRÜSS.
PAUL KÄHLE.
FRITZ LIENEWEG.